Aug. 29, 1939.   M. FARRELL   2,171,396
BRAKE MECHANISM
Filed May 2, 1938   2 Sheets-Sheet 1
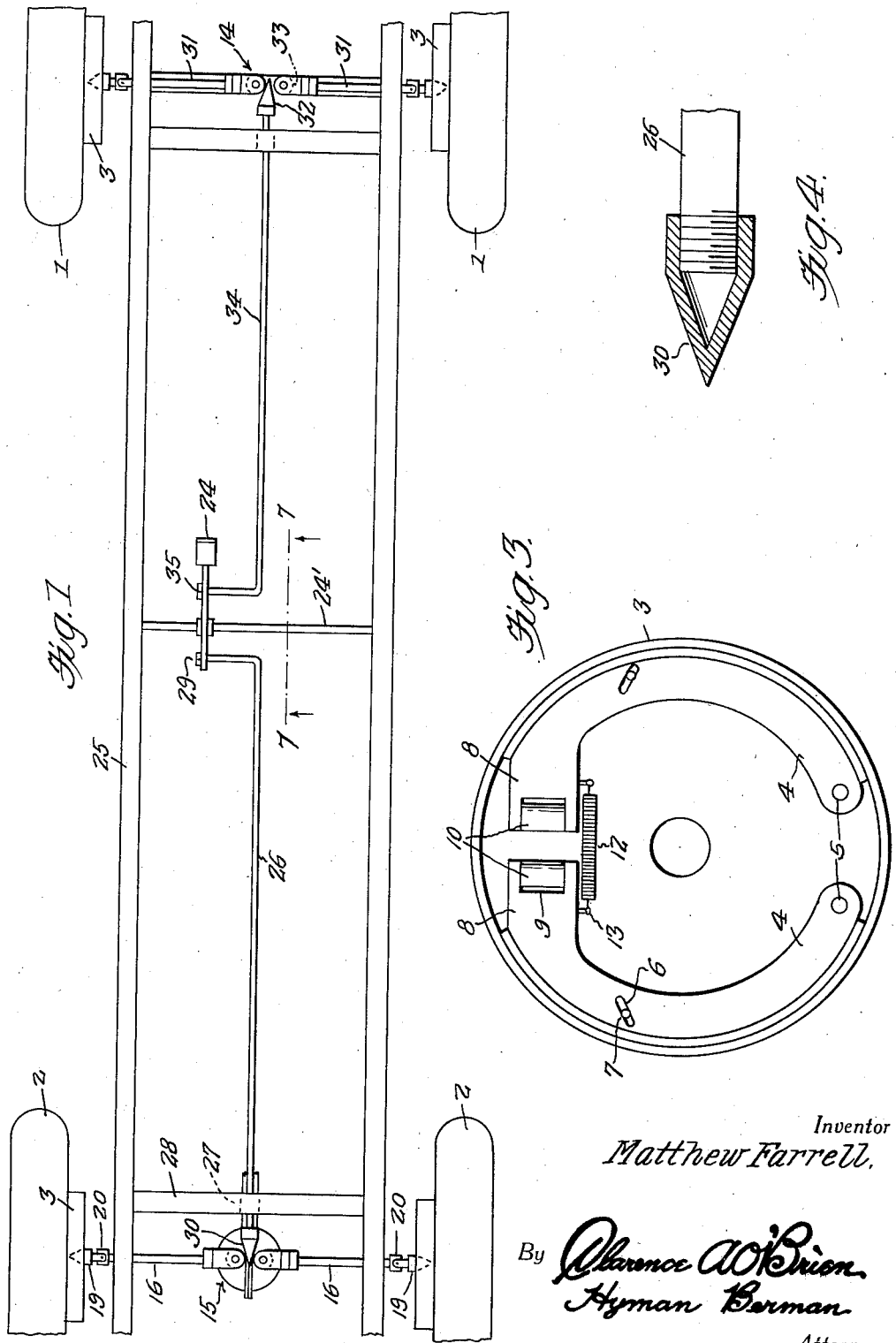
Inventor
Matthew Farrell, Aug. 29, 1939.  M. FARRELL  2,171,396
BRAKE MECHANISM
Filed May 2, 1938  2 Sheets-Sheet 2
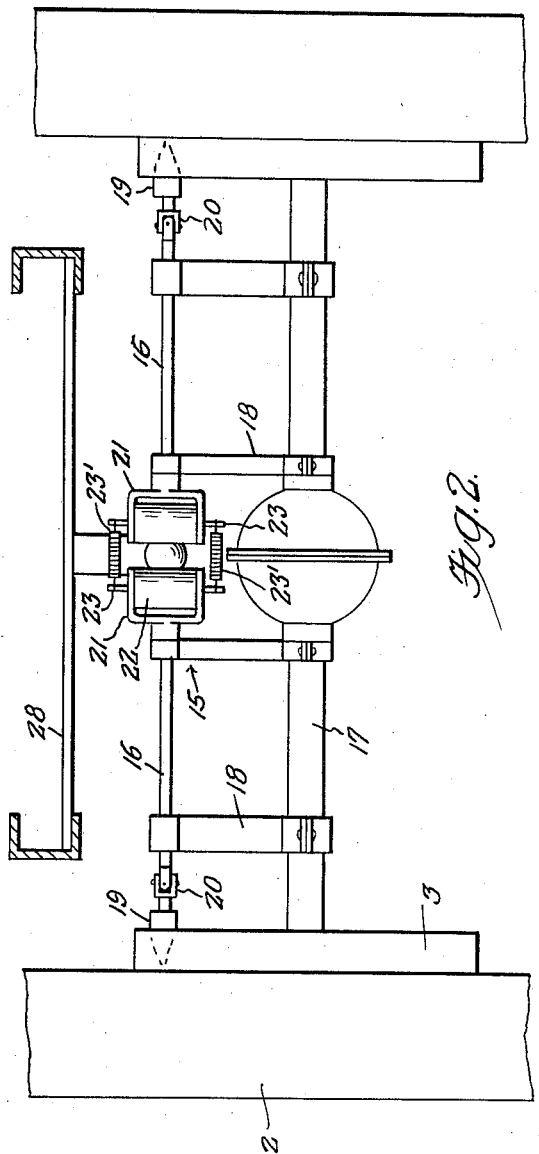
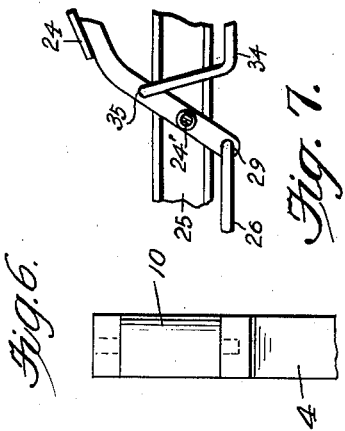
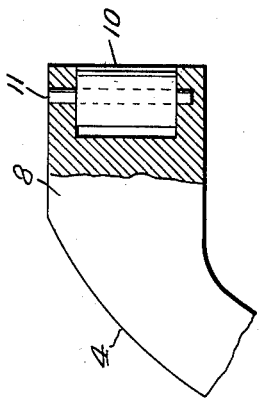
Inventor
*Matthew Farrell,*
By
*Clarence A. O'Brien*
*Hyman Berman*
Attorneys

Patented Aug. 29, 1939

2,171,396

UNITED STATES PATENT OFFICE 2,171,396

BRAKE MECHANISM

Matthew Farrell, Middleport, Pa.

Application May 2, 1938, Serial No. 205,592

1 Claim. (Cl. 188—10)

My invention relates to improvements in braking equipment for use more particularly on automobiles, although, as will presently more clearly appear, it is adaptable for use in practically any situation where expanding brake mechanism is desirable.

The invention is designed primarily to provide a simply constructed braking equipment which may be readily and inexpensively incorporated in present day automobiles and which is more highly efficient, as regards quick application of adequate braking force and equalizing braking action on all wheels, than the brake mechanisms now of commerce.

Other objects are to provide mechanism of the character and for the purpose above set forth which requires a minimum amount of service, will not lock, obviates wear between the parts, and is comparatively inexpensive to manufacture.

To the accomplishment of the above, and subordinate objects presently appearing, a preferred embodiment of my invention has been illustrated in the accompanying drawings, set forth in detail in the succeeding description, and defined in the claim appended hereto.

In said drawings:

Figure 1 is a view in top plan of the chassis and running gear of an automobile having my improved braking mechanism incorporated therewith, Figure 2 is a view in rear elevation drawn to an enlarged scale, parts showing in section, Figure 3 is a view in elevation of one of the brake drums and brake shoes associated therewith, Figure 4 is a fragmentary view partly in side elevation and partly in section of one of the brake rod spreader members, Figure 5 is a fragmentary view partly in elevation and partly in section of one of the brake shoes, and Figure 6 is a view in end elevation of said brake shoe.

Figure 7 is a fragmentary view in section taken on the line 7—7 of Figure 1 looking in the direction indicated by the arrows and drawn to an enlarged scale.

Referring to the drawings by numerals, in the illustrated embodiment of my invention, the front wheels 1 and the rear wheels 2 of the automobile are each provided with the usual brake drum 3 housing a pair of opposed, arcuate brake shoes 4 of usual construction, with the exceptions presently to be noted, and pivotally mounted, as indicated at 5, in vertical position on the usual adjunctive stationary plate or flange not shown. The pivotal mounting 5 of the brake shoes 4 supports the same for relative separative movement outwardly into braking positions and movement inwardly into ineffective or disengaging positions. Pins 6 extending from the aforesaid plate or flange into slots 7 in the brake shoes 4 limit movement of the latter to ineffective positions. According to my invention the upper ends of the brake shoes 4 are constructed to provide a pair of inwardly extending opposed shoe operating arms 8 bifurcated at their ends as at 9 and normally spaced apart. A pair of rollers 10 are mounted in the bifurcations 9 of said arms 8, respectively, for rotation about vertical pintles 11 in spaced apart relation. A tension spring 12 connected at its opposite ends to a pair of studs 13 depending from said arms 8, respectively, urges the shoes 4 into ineffective positions. The spring 12 underlies and bridges the space between the rollers 10 and thereby functions as a support in a manner presently described.

Associated with the front and rear wheel brakes are front and rear brake setting mechanisms 14 and 15. Since the mechanisms 14 and 15 are substantially duplicates in construction, a description of one will suffice for both.

The rear brake setting mechanism 15 comprises a pair of shoe operating rods 16 mounted on the rear axle 17, by upstanding brackets 18, to extend end to end, parallel with the axle upon opposite sides of the transverse center thereof, respectively, and for endwise sliding movement inwardly and outwardly. Suitable spline connections between the rods 16 and brackets 18 prevent rotation of said rods. At the outer end of each rod 16 is a conical spreader member 19 connected to said ends by a universal joint 20 and interposed between the rollers 10 of the adjacent pair of brake shoes 4. The spreader member 19, in each instance, is supported by the spring 12 of the related brake shoes 4. A pair of bifurcated bearing members 21 are fixed on the inner ends of said rods 16, respectively. A pair of rollers 22 are rotatably mounted in the bearing members 21, respectively, by vertically extending pintles 23 projecting at their upper and lower ends from said members 21. A pair of tension springs 23 connected to the upper and lower ends of said pintles 23 urge the rods 16 and rollers 22, inwardly.

The rods 16 of the rear brake setting mechanism 15 are adapted to be spread apart, or moved outwardly, under depression of the usual brake pedal 24 rocking on the transverse rod 24' extending between the side bars 25 of the chassis and through the medium of the following mechanism.

Extending rearwardly from the brake pedal 24, in the center of the chassis, is a rear brake rod 26 having its rear end slidably mounted in a bracket 27 depending from a transverse chassis bar 28 and its front end connected, as at 29, to said pedal 24 so that under depression of the latter said rod 26 is moved rearwardly. The rear end of the brake rod 26 has threaded thereon a conical spreader member 30 interposed between the rollers 22 whereby upon rearward movement of the brake rod 26 the shoe operating rods 16 will be moved outwardly in unison and uniformly. As will be understood such movement of the shoe operating rods 16 thrusts the spreader member 19 outwardly between the rollers 10 and the related brake shoes 4 are thereby spread apart into engagement with the asociated brake drums 3 in opposition to the springs 12 and 23'. Upon release of the brake pedal 24 the parts will assume normal brake releasing position under reaction of the springs 12 and 23'.

In the case of the front wheel brake setting mechanism 14 the shoe operating rods 31 are operated by means of a conical spreader 32 similar to spreader 30 interposed between the rollers 33 of said rods 31 and fast on the front end of a front brake rod 34 extending forwardly from the brake pedal 24 and connected thereto, as at 35, to be moved forwardly under depression of said pedal.

As will now be clear the spreader members 19 by virtue of the universal connection thereof to the rods 16 and 31 are free for play to equalize the thrust against the rollers 10 of the related brake shoes 4 so that an equal braking pressure is always exerted at all four wheels. Such movement of the spreader members 19 also compensate for wear between the various parts. The described spreader members 19 and rollers 12 also provides for reducing friction to a negligible degree in operation of the brake setting mechanism. Friction in the operating of the brake setting mechanism is further reduced by the coaction of the spreaders 30 and 32 with the rollers 22 and 33 as will be manifest.

The foregoing will, it is believed, suffice to impart a clear understanding of my invention without further explanation.

Manifestly, the invention as described, is susceptible of modification without departing from the inventive concept and right is herein reserved to all such modifications falling within the scope of the subjoined claim.

What I claim is:

Brake mechanism for automobiles comprising an opposed pair of brake shoes, the shoes of each pair operative with a separative action to set the same, and brake setting mechanism including a pair of shoe operating rods related to said pairs of shoes, respectively, and mounted on a fixed part of the automobile for separation endwise to set the shoes of their related pairs, spring means tensioning said rods against separation, a brake pedal, means operative by said pedal to separate said rods and comprising a pair of opposed rollers on said rods, respectively, and a spreader interposed between said rollers, and means operative by said rods to separate the shoes of their related pairs.

MATTHEW FARRELL.